United States Patent
Chao et al.

(10) Patent No.: US 6,335,937 B1
(45) Date of Patent: Jan. 1, 2002

(54) NODE FAILURE RECOVERY IN A HUB AND SPOKE DATA REPLICATION MECHANISM

(75) Inventors: Ching-Yun Chao; Roger Eldred Hough; Amal Ahmed Shaheen, all of Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/160,021

(22) Filed: Sep. 24, 1998

(51) Int. Cl.[7] .............................................. H04L 12/28
(52) U.S. Cl. ...................... 370/426; 370/216; 370/242
(58) Field of Search ................................. 370/216, 242, 370/312, 349, 395, 394, 346, 449, 426; 455/419, 420

(56) References Cited

U.S. PATENT DOCUMENTS 5,619,689 A * 4/1997 Kelly .......................... 707/201
6,128,483 A * 10/2000 Doiron et al. ............... 455/419

* cited by examiner

Primary Examiner—Wellington Chin
Assistant Examiner—Brenda H. Pham
(74) Attorney, Agent, or Firm—Winstead Sechrest & Minick P.C.; Jeffrey S. LaBaw

(57) ABSTRACT

A node failure recovery mechanism for use in a data replicating system in a distributed computer environment wherein a plurality of servers are configured about one or more central hubs in a hub and spoke arrangement. In each of a plurality of originating nodes, updates and associated origination sequence numbers are sent to the central hub. The hub sends updates and associated distribution sequence numbers to the plurality of originating nodes. The hub tracks acknowledgments sent by nodes for a destination sequence number acknowledged by all nodes. Upon failure of a node, a node failure recovery method may be used to enable a "buddy" node to help the failed node gain readmission to a distribution group.

22 Claims, 4 Drawing Sheets

NODE FAILURE RECOVERY IN A HUB AND SPOKE DATA REPLICATION MECHANISM

BACKGROUND OF THE INVENTION

1. Technical Field

The present invention relates to replication techniques that allow workgroups to connect locally and at the same time keep information synchronized across geographically dispersed sites.

2. Description of the Related Art

Enterprise messaging requirements are evolving beyond traditional store-and-forward e-mail to include the integration of groupware/workflow applications and tight coupling with the "browsing" model of corporate intranets. Another key trend, made possible by the proliferation of Internet standards, is ubiquitous access to information across standards-based networks and data stores. At the same time, the messaging infrastructure must be extended beyond the enterprise to business partners, customers and suppliers, to provide a significant return on investment in electronic messaging technologies.

As a result of these new imperatives, enterprise and inter-enterprise message traffic is expanding quickly beyond the limitations of disparate legacy systems, loosely coupled and separate mail and intranet systems, and the multitude of gateways connecting them. Indeed, companies are now faced with the task of consolidating heterogeneous e-mail systems, delivering access to new sources of information, and building a robust messaging infrastructure that meets current and expected enterprise requirements.

A known enterprise messaging solution is Lotus® Notes®, which is a platform-independent, distributed client-server architecture. Domino™ servers and Lotus Notes® clients together provide a reliable and flexible electronic mail system that "pushes" mail to recipients using industry standard message routing protocols, and that facilitates a "pull" paradigm in which users have the option to embed a link to an object in a message. The object can reside in a Domino database, an HTTP-based "intranet" data store, a page on the World Wide Web, or even a Windows® OLE link. Lotus Notes also tightly integrates groupware applications.

Groupware connects users across time and geography, leveraging the power of network computing. Ironically, networks present one of the biggest challenges to groupware implementation. Connections are sometimes unavailable or inadequate for demanding tasks. While this can be due to failure, there are many other reasons including, without limitation, mobile users, remote offices, and high transmission costs. Groupware has to keep users working together through all these scenarios. The technology that makes this possible is so-called replication. A replication mechanism puts information wherever it is needed and synchronized changes between replicas.

Thus, for example, using Lotus Domino™ replication services, an organization wishing to deploy a Web application to multiple locations may set up servers in each location. As data is changed in each location, the architecture ensures that databases are synchronized through replication. As another example, a salesperson who pays frequent visits to customer sites also needs to stay connected to the databases and information at her home office. When she leaves the office with a laptop computer, she makes a copy or replica of the lead tracking and customer service databases that she needs. While out of the office, however, other account managers may make changes to the server database at the same time that she is making her own changes. The salesperson can re-synchronize the two by replicating again over a telephone connection. All updates, additions and deletions that were made to the server after she left the office are now replicated to the laptop database, and all updates, additions and deletions she made on the laptop database are replicated back to the server database. The replication process also detects update conflicts and flags them for the salesperson and other users to reconcile.

There are several known replication techniques that allow workgroup users to connect to a local server and at the same time keep information synchronized across geographically dispersed sites. Documents in the replicated database are composed of fields. When two servers desire to synchronize their respective version of a given document, the most recent field entry for each field of the document is often used for replication purposes. If timely replication is desired, updates to one replica are propagated to other replicas as soon as possible. For example, in Lotus Notes Clustering Release 4.5, replication is effected by having every server convey an update to every other server whenever a local update occurs. This approach suffers from the drawback of not being readily scaleable. Another approach is "scheduled replication", wherein a pair of servers periodically wake up and compare data sets. This requires every data set on both servers to be compared and is strictly a two way operation. Scheduled replication is costly and cannot be done in a timely fashion, and it also creates a significant amount of undesirable network traffic.

Other known techniques (e.g., Microsoft Exchange) provides a simple, first generation messaging-based replication scheme. This technique relies on store-and-forward mail to push changes from one server to other defined replicas on other servers. There is no comparison operation, however, to guarantee that replicas remain synchronized. Such a system significantly increases administrative and end-user burden. Moreover, if a user changes even a single property or field of a document, the entire document must be replicated rather than just the property or field. Netscape Suitespot uses proxy servers for locally caching Web pages, which reduces network bandwidth requirements. This technique, however, is merely duplication—copying files from a distant place to a closer place—and there is no relationship between the copies. It is not a true replication mechanism.

There remains a need to provide enhanced replication schemes that address the deficiencies in the prior art.

BRIEF SUMMARY OF THE INVENTION

It is a primary object of this invention to replicate data in a timely manner across a large number of nodes.

It is another primary object of this invention to provide replication enhancements in a distributed system that significantly reduce network traffic.

It is still another primary object of this invention to provide high performance, realtime replication in a geographically-dispersed network topology.

Still another primary object is to provide a simple replication mechanism that is highly scaleable.

A particular object of this invention is to configure a replication mechanism within a hub and spoke network architecture.

Still another particular object is to enable sliding window acknowledgment through the hub on a broadcast to nodes in the network architecture.

Yet another object of the present invention is to enable spokes to issue periodic acknowledgments to the central hub, and for the central hub to issue periodic acknowledgments to the originating spokes, wherein such acknowledgments effectively indicate the vitality of the nodes within the system as well as any need for packet retransmission.

Still another object of this invention is to provide a spoke failure mechanism for isolating a failed hub from a group of distribution nodes that are targeted to receive update(s), and for selectively re-admitting the failed hub back into the distribution group.

A further object of this invention is to implement a multilevel replication mechanism, for example, wherein first level hubs participate as second level spokes in a recursible architecture extendible to any depth desired.

Another more general object is to synchronize multiple database replicas in a distributed computer environment. These databases, for example, may be local replicas of databases on a large number of servers, registry information servers, domain name servers, LDAP directory servers, public key security servers, or the like.

These and other objects are provided in a method for replicating data in a distributed system comprising a plurality of originating nodes associated with a central hub. Each of the plurality of originating nodes sends updates and associated origination sequence numbers to the central hub. A given update is directed to a distribution group comprising a set or subset of the originating nodes and typically comprises the changes in a given data set supported in a database on each such originating node. According to the method, the central hub receives, packages and sends the updates with associated distribution sequence numbers to the plurality of originating nodes. In the central hub, acknowledgments sent by originating nodes are then tracked. Each acknowledgment preferably identifies a last in-sequence distribution sequence number processed by a respective originating node. The central hub then periodically sends a message to each originating node. The message includes information identifying a highest origination sequence number acknowledged by originating nodes (comprising the given distribution group) and the highest origination sequence number associated with an update received at the central hub from the originating node.

Thus, in the inventive scheme, the originating node applies its origination sequence number to a given update and the central hub applies the hub distribution sequence number to its broadcast of that update. The periodic acknowledgment by the central hub triggers retransmission of dropped packets from the nodes, and the periodic acknowledgment by the nodes trigger retransmission of dropped packets from the hub. The periodic acknowledgments also serve as a "heartbeat" to indicate the vitality of the nodes within the system.

According to the replication scheme, updates and associated distribution sequence numbers are only sent (by the central hub) to originating nodes having no more than a permitted quantity of unacknowledged updates. The central hub also rebroadcasts updates and associated distribution sequence numbers to originating nodes whose acknowledgments indicate lack of receipt of updates from the central hub. Rebroadcasting begins with an update associated with a lowest unacknowledged distribution sequence number. Upon failure of a given originating node, the node is isolated from other nodes in the given distribution group. If the failed node later resurfaces, a node failure recovery scheme is implemented.

In particular, the failed originating node is associated with another originating node (a "buddy" node) in the given distribution group. The buddy node will be used to provide a current copy of the data set to the failed node and thus bring the failed node back into the distribution group. Before this transfer begins, however, the last-acknowledged sequence number is first taken from the buddy node. If necessary, the hub then admits the buddy node to the distribution group. The failed node is then provided with a current copy of a data set from the buddy node. The failed node rejoins the group and becomes eligible for updates at the start of the copy from the buddy node, although actual transmission of updates is likely to be delayed until after the node tells the hub its copy has completed.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
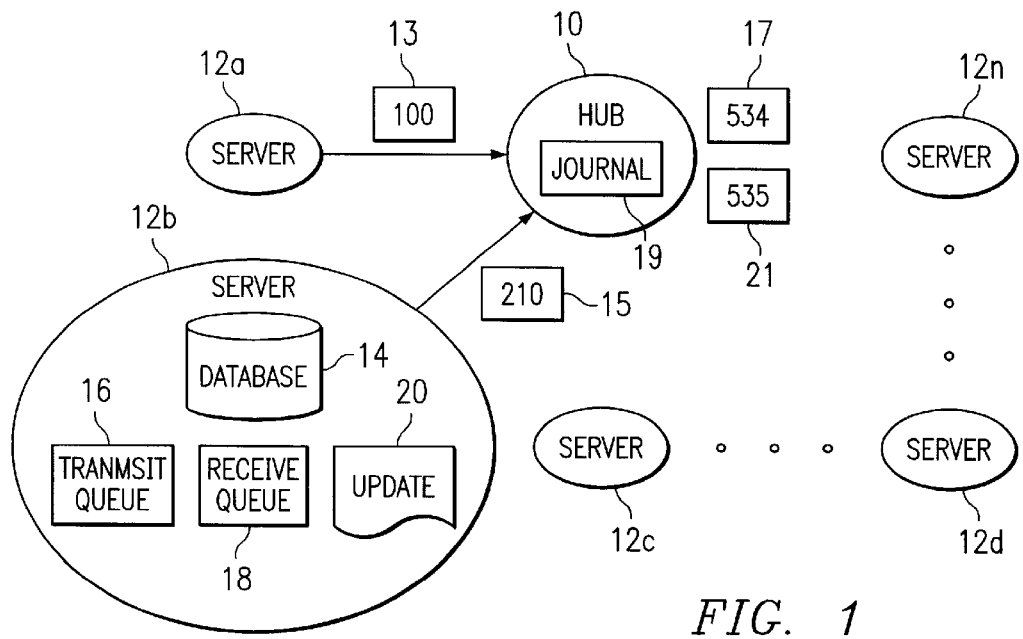
FIG. 1 is a simplified block diagram of a hub and spoke architecture in which the inventive replication mechanism is implemented.

Preferably, a set of nodes dispersed geographically are organized into a "hub and spoke" topology as illustrated in FIG. 1. In this arrangement, a central hub 10 has a plurality of originating nodes 12a–n associated therewith. Each originating node preferably is a server running a messaging/ groupware package such as Lotus Domino, and each server has associated therewith a plurality of clients/users (not shown). Typically, the central hub is a lightweight application running on a computer, and the computer is preferably located on the same physical wire used by its local originating nodes. Each originating node located at a "spoke" in the topology supports at least one database 14, a transmit queue 16 and a receive queue 18. Central hub has a destination queue or journal 19.

Each node in the hub and spoke topology thus preferably contains a replica of the database 14. The hub may include the actual database but typically does not, and the hub need not participate in the scheme as a spoke (except as described below with respect to FIG. 6). The database includes a plurality of documents or data set(s) that are periodically updated by one or more users associated with a given node. An update 20 generated at a given node is typically a change (i.e. the delta) in a given document or data set supported across a subset of the other nodes in the network. Usually, the changes occur in given field values of the data set. A given node (i.e. one of the spokes in the hub and spoke topology) need not always be a server at which changes to documents originate. Thus, for example, a given machine at such a node (whether server or client) may be simply a slave for backup purposes.

The present invention provides a mechanism for replicating an update on other nodes that have the same data set. Thus, for example, changes to documents at the field level are captured and replicated across the server nodes. The central hub and each of the servers preferably include a map of the servers that have the same document or data set. A given update thus may be targeted to a given "distribution group" of servers supporting the same data set. The distribution group may include all of the originating nodes or some subset or quorum thereof. It may also include standby backup nodes that are passive (i.e. nodes that originate nothing but are still in the distribution group) to permit, for example, implementations in which replicas exist on clients as well as servers.

As will be seen, a given node may (but need not) "package" one or more updates to the central hub in a compressed format (e.g., within a zip file). When a plurality of updates are packaged together, this is sometimes referred to herein as "batching". The central hub, as will be seen, may likewise batch updates for multiple data sets (in a package) so that distribution from the central hub may be effected for several data sets at one time. On occasion, a particular central hub distribution package may include an update directed to a given destination node as well as another update that the given destination may not care about. In such case, the latter update may simply be ignored or discarded. Communications between an originating node and the hub are typically encrypted and authenticated in a known manner (e.g., via a secure sockets layer).

According to the invention, each package (which may include one or more updates) transmitted from a given originating node (to the central hub) has an originating sequence number associated therewith. This number, preferably, is ever increasing. Thus, as illustrated in FIG. 1, the package 13 being transmitted from node 12a has a given originating sequence number (e.g., 100) while package 15 being transmitted from node 12b has a different originating sequence number (e.g., 210). Whenever a new update received at a particular originating node is packaged for transmission, that node's sequence number is increased and the resulting sequence number is associated with the package. In like manner, central hub 10 has a distribution sequence number associated therewith which, preferably, is ever increasing. Whenever a package (including one or more given updates from one or more originating nodes) is prepared for broadcast by the central hub, the hub's distribution sequence number is increased and the resulting sequence number is associated with the package.

Thus, in the preferred embodiment, a particular origination sequence number is associated with each package created at a given origination node. Likewise, a hub or distribution sequence number is associated with each package created at the central hub. Of course, if a given package includes a single update, the origination sequence number (in either case) may be considered associated with just that update.

Using the example originating sequence numbers identified above, at a given processing cycle (or point in time) server 12a has the update package 13 with origination sequence number 100, server 12b has update package 15 with origination sequence number 210 as previously described. Central hub, by way of example, associates package 13 (from node 12a) with a hub package 17 having destination sequence number 534, while update 15 (from node 12b) is associated with a hub package 21 having destination sequence number 535.

Figure 2A:
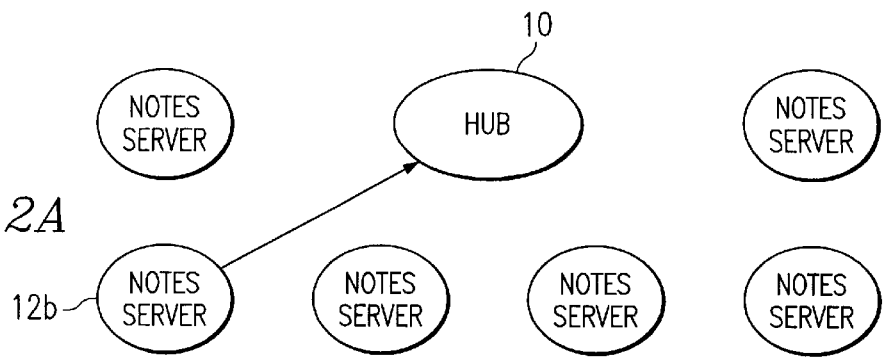
FIG. 2A illustrates an originating node transmitting an update to the central hub.

FIGS. 2A–2D illustrate the preferred inventive replication method of the present invention. Referring first to FIG. 2A, assume that the server at node 12b desires to send an update to a given data set located on a distribution group. In this example, it is assumed that the distribution group includes all of the servers illustrated. As noted above, typically the central hub and each of the servers include a map of which servers support each given data set. As will be described in more detail below, the server 12b polls its transmit queue (to locate the update), and then compresses and sends the update (preferably in a .zip package) to the central hub 10 as illustrated. Compression is not required. Each update is preferably queued at its originating node until an acknowledgment is later received from the hub that all nodes in the distribution group have received it. As noted above, updates may be batched together within a given package. Upon receipt of the package, the central hub places the received update in its queue or journal for subsequent distribution.

Figure 2B:
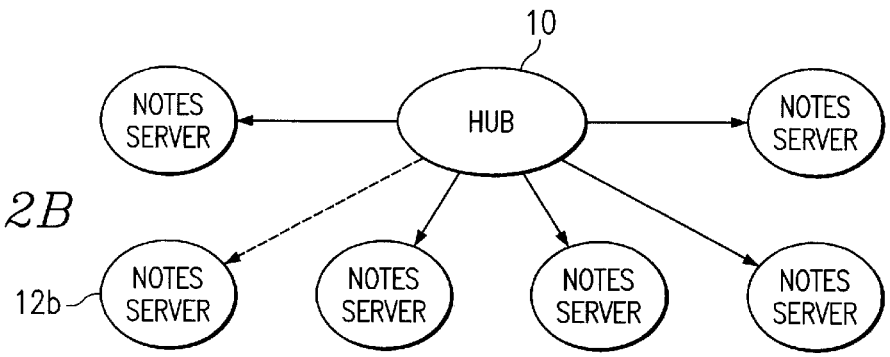
FIG. 2B illustrates the central hub broadcasting the update to a distribution group.

FIG. 2B illustrates the distribution of this update from the central hub 10 to each of the nodes of the distribution group. In particular, and as will be described below, the central hub periodically polls its queue, packages each pending update (either singularly or jointly with other updates) and then broadcasts the package to the destination nodes comprising the distribution group. As illustrated in FIG. 2B by the dotted line, the originating node (in the case server 12b) may or may not receive the pending update that originated from that node.

Figure 2C:
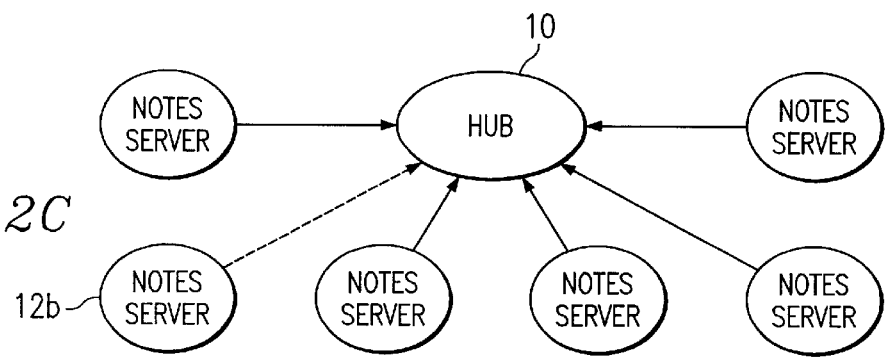
FIG. 2C illustrates node acknowledgment of the update.

Turning now to FIG. 2C, each destination node then "acknowledges" back to the central hub. This is preferably accomplished by having each node periodically wake up and determine the last in-sequence update received. This information is then acknowledged back to the central hub, as indicated by the arrows, and continues periodically for each node. Thus, a node acknowledges to the central hub the successful receipt of an update by acknowledging that update or any subsequent update from the hub.

Figure 2D:
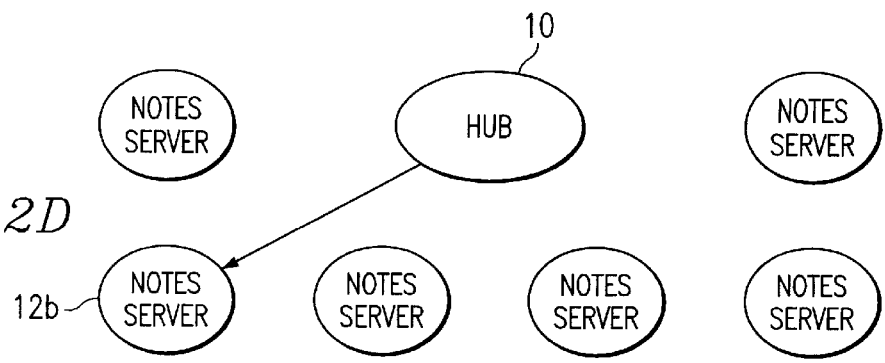
FIG. 2D illustrates the central hub returning an acknowledgment back to the originating node.

In FIG. 2D, the central hub then acknowledges the originating node, server 12b, when it determines the last in-sequence updates have been acknowledged by all spokes in the distribution group. The central hub continues to acknowledge to each node periodically. Thus, the central hub acknowledges the successful broadcast of an update to all nodes (of the distribution group) by acknowledging that update or any subsequent update from the same originating node. This is the basic replication scheme unless there is a given hub or spoke failure, each of which will now be briefly described.

Figure 3:
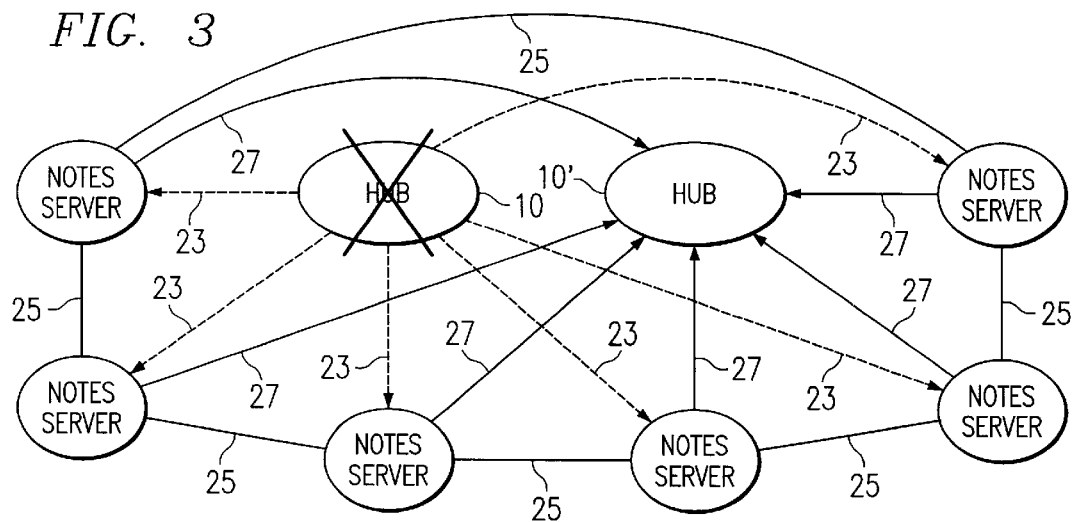
FIG. 3 is a block diagram illustrating a hub failure recovery mechanism of the present invention.

A given hub failure is typically indicated by lack of periodic acknowledgments 23 (as was illustrated in FIG. 2D above) from the central hub to the spoke nodes. As illustrated in FIG. 3, when this condition occurs, the nodes confer on designation of a new hub via connection 25. Upon designation of the new hub 10', updates not yet acknowledged from all spoke nodes in the distribution group are then retransmitted to the new hub as illustrated by reference numeral 27. New hub 10' may or may not have been a spoke node, as the actual hub need not be a physical device. The hub process may coexist with the server processes on any node or reside on some other system. In this hub recovery operation, each node retransmits to the new hub every update for which the failed hub has not indicated successful receipt by every node in the distribution group. Thus, given nodes may receive the same update twice (once from the failed hub, and later from the new hub).

Figure 4:
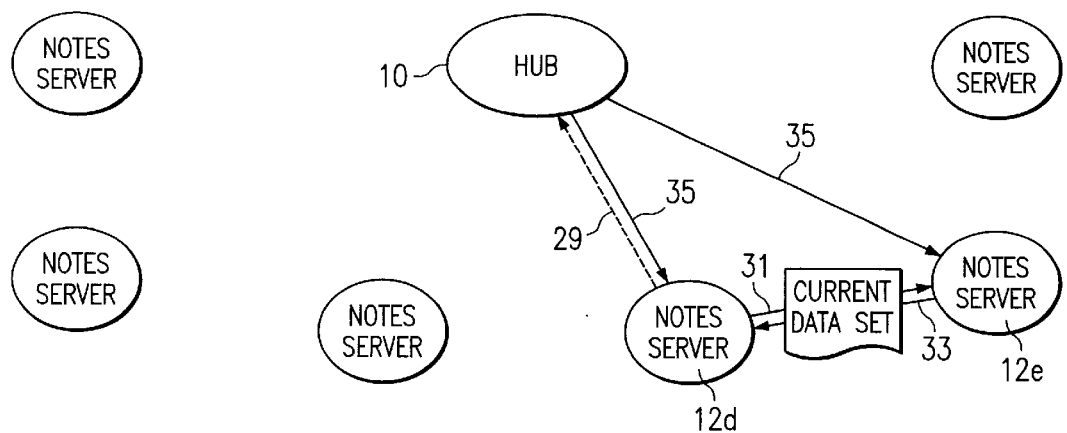
FIG. 4 is a block diagram illustrating a node failure recovery mechanism of the present invention.

The node failure mode is illustrated in FIG. 4. In this mode, a given node 12d is determined to have failed by repeatedly failing to acknowledge 29 the central hub (which is the normal operation illustrated in FIG. 2D) or by sending acknowledgments which indicate it is incapable of keeping up with the remainder of the distribution group. In such case, the hub 10 "fences" or isolates the failed node 12d from the other nodes of the distribution group, ceasing further distribution to that node and notifying other nodes of this change in the distribution group. There are a number of ways to propagate the change in distribution map with the simplest being that the hub merely notifies all of the nodes of the change. Another approach would be to notify the other nodes by piggybacking such notice on a next message, or to provide such notice on a demand basis. Preferably, however, at least one node should be immediately notified of the change in status in the event the hub should later fail, and all nodes must be notified of the state change (of a given node) at the time any hub recovery occurs as described below. Thus, according to the invention, upon a spoke node failure, the hub notifies the other nodes of this situation.

If the fenced-off node later resurfaces and seeks to re-enter the distribution group, preferably the hub 10 first designates a "buddy" node (e.g., node 12e) for the "failed" node. The buddy node will be used to provide a current copy of the data set to the failed node and thus bring the failed node back into the distribution group. Before this transfer begins, however, the last-acknowledged sequence number is first taken from the buddy node. If necessary, the hub then admits the buddy node to the distribution group, although updates are preferably held (or deferred) pending completion of the copy process. The failed node then requests (numeral 31) a then-current copy of the data set, which is then returned (numeral 33) by the buddy node 12e. The failed node rejoins the distribution group and becomes eligible for updates at the start of the copy from the buddy node, although typically actual transmission (of updates) is likely to be delayed until after the failed node (now readmitted to the group) informs the hub that its copy has completed. The buddy node is not frozen to block it from accepting changes from clients or the hub during the copy process. This node, however, this node is effectively frozen on each document but is free to take other work between documents.

According to the present invention, the originating node applies its origination sequence number to a given update (or package), and the central hub applies the hub distribution sequence number to its broadcasts. The periodic acknowledgment by the central hub triggers retransmission of dropped packets from the spoke nodes, and the periodic acknowledgment by the nodes trigger retransmission of dropped packets from the hub. Thus, the periodic acknowledgments serve as a "heartbeat" to indicate the vitality of a given node within the system.

FIGS. 5A–5D illustrate detailed flowcharts showing these routines. As will be seen, given steps of these flowcharts are carried out at the nodes and/or at the central hub. They are preferably implemented as computer software instructions stored in memory and executed by a processor. Thus, one preferred implementation of the present invention is as a computer program product in a computer-readable medium. A "spoke" portion of this software is executed on each node, and a "central hub" portion is executed on the central hub (or on a given hub that takes over in the hub failure mode as illustrated in FIG. 3).

Figure 5A:
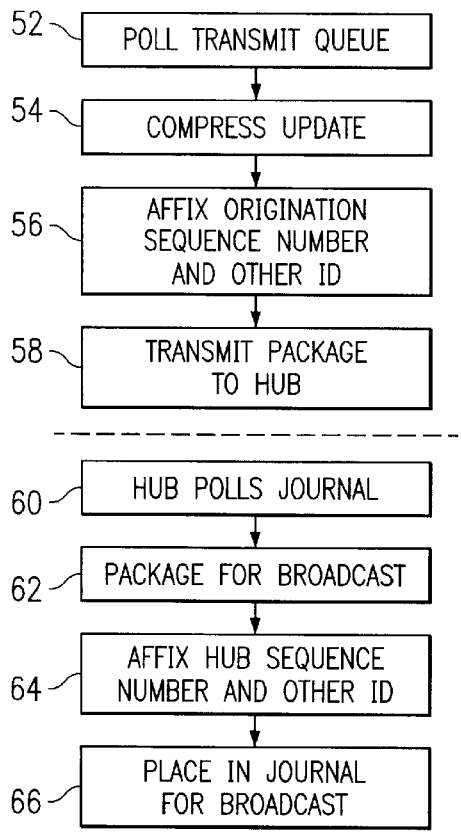
FIG. 5A is a flowchart illustrating a routine for transferring updates from originating nodes to the central hub.

FIG. 5A is a flowchart describing the preferred routine for transferring updates from each node to the central hub. As noted above, this routine preferably is implemented on each server or other machine operating as an originating node. At step 52, the node periodically polls its transmit queue looking for updates. As noted above, updates intended for other nodes are stored in the node's transmit queue. At step 54, if an update is present in the transmit queue, the routine compresses it (for example, using InfoZip™ freeware or WinZip™ shareware) and packages the update for transmission to the central hub. The routine then continues at step 56 by affixing a node identifier (ID) and an originating sequence number to the package. As previously described, each package (or each update) includes an associated originating sequence number. At step 58, the node transmits the package to the central hub. As noted above, a given package may include multiple updates in a "batch". For simplicity of following discussion, a given package includes just one update. The routine continues at the central hub with step 60. At this point, the hub polls its queue or journal for any received updates. This step, for example, may be carried out every few seconds. At step 62, assuming one or more updates have been received, the hub packages them for transmission. At step 64, and in connection therewith, the hub affixes to each package a hub identifier (ID), a hub sequence number, the originating node identifier, the originating node sequence number (associated with the package in which the update was received), and a destination group identifier identifying which nodes actually contain the data set being updated. At step 66, the central hub control routine places the package and the accompanying information into its journal for transmission.

Figure 5B:
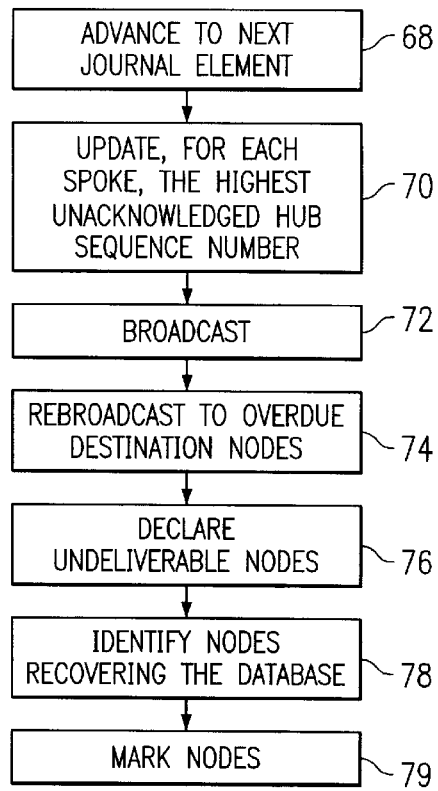
FIG. 5B is a flowchart illustrating a routine for broadcasting updates from the central hub to destination nodes.

FIG. 5B is the routine by which updates are broadcast or otherwise delivered from the central hub to the spoke nodes. The preferred technique for distributing updates is interrupt-driven Internet Protocol (IP) multicasting, although one of ordinary skill will appreciate that any suitable broadcast technique may be used. The routine begins at step 68 with the control routine advancing to a next element of the queue or journal of packages to be broadcast. At step 70, the routine updates, for each spoke node, the highest unacknowledged hub sequence number. At step 72, the routine broadcasts the update to nodes with no more than a (preferably selectable) maximum permitted quantity (count and/or size) of unacknowledged update packages. Thus, if a particular node is far behind in acknowledging or far behind in receiving (as indicated by acknowledging prior update broadcasts), it will not be provided any new updates. Rather, the node is thus fenced-off or isolated from the rest of the distribution group according to the node failure scenario illustrated above in FIG. 4.

At step 74, the control routine rebroadcasts where necessary to overdue destination nodes, preferably beginning at a package with the lowest unacknowledged hub sequence number. Thus, for example, if a given node has acknowledged sequence number 535, but sequence numbers 537 and 538 have already been sent, this step would rebroadcast beginning with sequence number 536. At step 76, the routine declares a given destination node undeliverable when a selectable maximum permitted retry threshold is reached. Thus, step 76 occurs when the node does not send a timely acknowledgment or when its acknowledgments indicate that it is unable to keep pace with the distribution group. Again, this scenario causes the spoke to be isolated from the destination group as previously described. At step 78, the routine checks to see which destination group nodes are in the process of creating or recovering the database. At step 79, the central hub marks those nodes and makes no attempt to send further updates until the importation is complete. The destination nodes preferably inherit the last sequence number acknowledged to the hub from the destination node from which they are importing the database at the time importation begins.

Figure 5C:
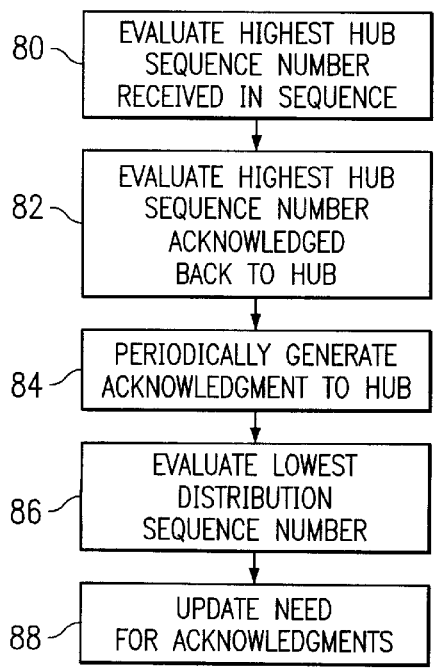
FIG. 5C is a flowchart illustrating a node acknowledgment routine by which individual nodes acknowledge to the central hub receipt of updates.

FIG. 5C is a flowchart describing the node acknowledgment routine. It begins at step 80 by evaluating the highest distribution sequence number received in sequence. Step 82 evaluates the highest distribution sequence number acknowledged back to the central hub. At step 84, the routine periodically generates an acknowledgment to the central hub when the numbers (obtained at steps 80 and 82) differ or when no updates have been received for a given, selectable time period. At step 86, the central hub evaluates the lowest distribution sequence number of the package for which all destinations have acknowledged receipt. The routine then continues at step 88 with the hub updating the need for acknowledgments to nodes whenever the lowest sequence number of the package for which all destinations have acknowledged receipt is updated. Preferably, this step is accomplished using a bit mask over the originating nodes.

Figure 5D:
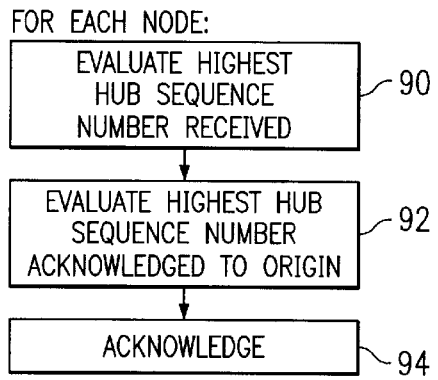
FIG. 5D is a flowchart illustrating a hub acknowledgment routine by which the hub acknowledges updates to the nodes.

FIG. 5D is a flowchart illustrating a hub acknowledgment routine. For each originating node, the central hub maintains a highest distribution sequence number received and a highest distribution sequence number acknowledged to its origin. At step 90, the highest distribution sequence number received is evaluated. The highest distribution sequence number acknowledged to origin (i.e. the originating node) is evaluated at step 92. At step 94, the central hub periodically sends acknowledgments to the originating nodes. Such acknowledgments are sent in the form of messages. Generally, a message is sent (from the central hub to a given originating node) that includes information identifying a highest origination sequence number acknowledged by all nodes of the distribution group and the highest origination sequence number associated with the package last transmitted from that originating node and received at the hub. Thus, at step 96, the hub sends acknowledgments to originating nodes (a) for which all packages have been broadcast or declared undeliverable to all recipients, or (b) for which no packages have been received for a given, substantial period of time. This completes the processing.

To provide a concrete example, assume that a first originating node has sent a package having an origination sequence number 100, while a second originating node has sent a package having an origination sequence number 210. The package associated with origination sequence number 100 (from the first originating node) has been given distribution sequence number 534 and transmitted by the central hub. The package associated with origination sequence number 210 (from the second originating node) has been given distribution sequence number 535 and transmitted by the central hub. Once distribution sequence number 535 has been acknowledged by each node of the given destination group, the central hub (in its periodic message) tells the first originating node that its update (corresponding to origination sequence number 100) has been received by all nodes comprising the relevant distribution group. This is necessarily the case because if the package associated with the distribution sequence number 535 was received, it follows that the earlier package (i.e. the one associated with the lower distribution sequence number 534) was also properly received and processed. The central hub also sends a message to the second originating spoke confirming that its update (i.e. the one corresponding to the highest distribution sequence number 535) was received.

Thus, when the central hub issues its acknowledgment back to the originating nodes, it must first perform a translation of the distribution sequence number to the respective origination sequence number. Continuing with the above example, once the originating nodes acknowledge distribution sequence number 535, central hub translates this number back to the origination sequence number (in this case 210) which is delivered to the origin node. For the other nodes, the central hub identifies the closest (but lower) distribution sequence number (in this case 534) and then translates that number to its corresponding origination sequence number (in this case, 100).

In this manner, it can be seen that the central hub acknowledges successful broadcast of an update to all nodes by acknowledging that update or any subsequent update from the same originating node. Likewise, a node acknowledges successful receipt of an update to the hub by acknowledging that update or any subsequent update from the hub. The above-described scheme facilitates a so-called "sliding window" acknowledgment through the central hub on a broadcast to a set of originating nodes. In particular, when a given originating node sends a given update to the central hub, it does not have to wait for a specific acknowledgment to know that the given update, in fact, was received by the target nodes. Indeed, the given originating node will know this to be the case if it receives a highest origination sequence number from the central hub that corresponds to a later-transmitted update.

Figure 6:
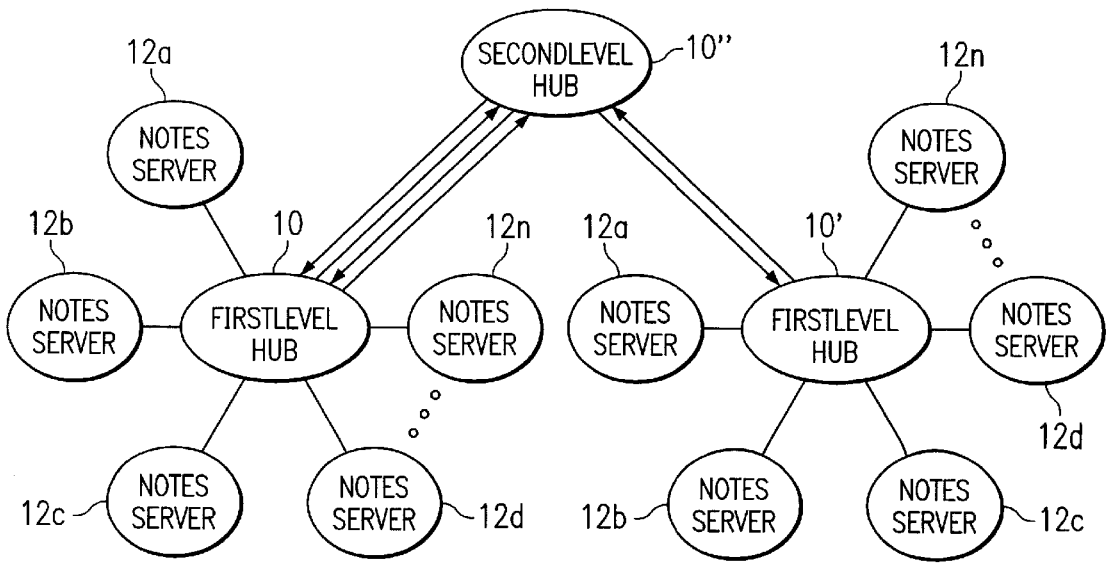
FIG. 6 is a block diagram illustrating how the inventive architecture implements a recursive, multilevel replication functionality.

FIG. 6 illustrates how the present invention may be implemented in a multilevel, recursive architecture. In this embodiment, first level hubs 10 and 10' each have associated therewith a set of originating nodes 12a–12n as previously described. First level hubs 10 and 10', however, participate as second level spokes with respect to a second level hub 10". Thus, the second level hub 10" receives updates from the first level spokes (really the first level hubs). In like manner, this architecture is repeatable for any desired level of recursion. This facilitates a robust and scaleable replication mechanism.

A representative server/central hub is a computer having an operating system and support for network connectivity. Thus, for example, a representative computer comprises a computer running Windows NT (Intel and DEC Alpha), IBM OS/2, IBM AIX, HP-UX, Sun Solaris (SPARC and Intel Edition), Novell NetWare or Windows '95.

As noted above, one of the preferred embodiments of the routines of this invention is as a set of instructions (computer program code) in a code module resident in or downloadable to the random access memory of a computer.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

What is claimed is:

1. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node; and isolating a given originating node from the distribution group upon a given occurrence.

2. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node; and isolating a given originating node from the distribution group upon a given occurrence wherein the given occurrence is that the given originating node's acknowledgments to the central hub indicate that the given originating node cannot keep pace with a remainder of the plurality with respect to processing of the updates.

3. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node; and isolating a given originating node from the distribution group upon a given occurrence wherein the given occurrence is that the given originating node is not timely providing periodic acknowledgments.

4. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node;

isolating a given originating node from the distribution group upon a given occurrence; and determining whether the given originating node is attempting to rejoin the distribution group.

5. The method as described in claim 4 wherein if the given originating node is attempting to rejoin the distribution group, initiating a node recovery protocol to enable the given originating node to be readmitted to the distribution group.

6. The method as described in claim 5 wherein the node recovery protocol includes the steps of:

associating the given originating node with a buddy node; and transferring a current copy of the data set from the buddy node to the given originating node.

7. The method as described in claim 6 further including the step of admitting the buddy node to the distribution group if necessary prior to transferring the current copy of the data set to the given originating node.

8. The method as described in claim 6 further including the steps of:

having the buddy node provide the central hub with its last in-sequence distribution sequence number prior to the transferring step.

9. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node; and isolating a given originating node from the distribution group upon a given occurrence wherein the isolating step includes the step of having the central hub notify other nodes that the given originating node has been isolated from the distribution group.

10. A method for replicating data in a distributed system comprising a plurality of originating nodes associated with a central hub, wherein origination nodes send updates and associated origination sequence numbers to the central hub, comprising the steps of:

from the central hub, sending updates and associated distribution sequence numbers to a distribution group comprising a plurality of originating nodes;

in the central hub, tracking periodic acknowledgments sent by originating nodes, each acknowledgment identifying a last in-sequence distribution sequence number processed by a respective originating node;

isolating a given originating node from the distribution group if the given originating node's acknowledgments to the central hub indicate that the given originating node cannot keep pace with a remainder of the distribution group with respect to processing of the updates; and selectively initiating a node failure recovery protocol to enable the given originating node to rejoin the distribution group.

11. The method as described in claim 10 wherein the node recovery protocol includes the steps of:

associating the given originating node with a buddy node;

readmitting the given originating node to the distribution group; and transferring a current copy of the data set from the buddy node to the given originating node.

12. The method as described in claim 11 further including the step of admitting the buddy node to the distribution group if necessary prior to readmitting the given originating node.

13. The method as described in claim 10 wherein the readmitting step includes the steps of:

having the buddy node provide the central hub its last in-sequence distribution sequence number prior to the transferring step.

14. The method as described in claim 10 wherein the isolating step includes the step of having the central hub notify at least one other node that the given originating node has been isolated from the distribution group.

15. A computer program product in a computer-readable medium for replicating data in a distributed system comprising a plurality of originating nodes associated with a central hub, wherein origination nodes send updates and associated origination sequence numbers to the central hub, comprising:

means operative in the central hub for sending updates and associated distribution sequence numbers to a distribution group comprising a plurality of originating nodes;

means operative in the central hub for tracking acknowledgments sent by originating nodes, each acknowledgment identifying a last in-sequence distribution sequence number processed by a respective originating node; and;

means operative in the central hub for isolating a given originating node from a given distribution group.

16. A computer program product in a computer-readable medium for replicating data in a distributed system comprising a plurality of originating nodes associated with a central hub, wherein origination nodes send updates and associated origination sequence numbers to the central hub, comprising:

means operative in the central hub for sending updates and associated distribution sequence numbers to a distribution group comprising a plurality of originating nodes;

means operative in the central hub for tracking acknowledgments sent by originating nodes, each acknowledgment identifying a last in-sequence distribution sequence number processed by a respective originating node; and means operative in the central hub for isolating a given originating node from a given distribution group wherein the isolating means isolates the given originating node from the distribution group if the given originating node's acknowledgments to the central hub indicate that the given originating node cannot keep pace with the remainder of the distribution group with respect to processing of the updates.

17. The computer program product as described in claim 16 further including means operative in the central hub and responsive to isolation of the given originating node for notifying other nodes that the given originating node has been isolated from the distribution group.

18. A computer program product in a computer-readable medium for replicating data in a distributed system comprising a plurality of originating nodes associated with a central hub, wherein origination nodes send updates and associated origination sequence numbers to the central hub, comprising:

means operative in the central hub for sending updates and associated distribution sequence numbers to a distribution group comprising a plurality of originating nodes;

means operative in the central hub for tracking acknowledgments sent by originating nodes, each acknowledgment identifying a last in-sequence distribution sequence number processed by a respective originating node;

means operative in the central hub for isolating a given originating node from a given distribution group; and means for readmitting the given originating node back into the distribution group.

19. The computer program product as described in claim 18 wherein the readmitting means includes:

means for associating a buddy node to the given originating node; and means for controlling the buddy node to transfer a current copy of a data set to the given originating node.

20. A computer for controlling replication of data in a distributed system comprising a plurality of originating nodes configured as spokes with respect to the computer, wherein origination nodes send updates and associated origination sequence numbers to the computer, comprising:

a processor;

storage means;

first instruction means executed by the processor for sending updates and associated distribution sequence numbers to a distribution group comprising a plurality of originating nodes;

second instruction means executed by the processor for tracking acknowledgments sent by originating nodes, each acknowledgment identifying a last in-sequence distribution sequence number processed by a respective originating node; and;

third instruction means executed by the processor for isolating a given originating node from a given distribution group.

21. A computer for controlling replication of data in a distributed system comprising a plurality of originating nodes configured as spokes with respect to the computer, wherein origination nodes send updates and associated origination sequence numbers to the computer, comprising:

a processor;

storage means;

first instruction means executed by the processor for sending updates and associated distribution sequence numbers to a distribution group comprising a plurality of originating nodes;

second instruction means executed by the processor for each tracking acknowledgments sent by originating nodes, each acknowledgment identifying a last in-sequence distribution sequence number processed by a respective originating node;

third instruction means executed by the processor for isolating a given originating node from a given distribution group; and fourth instruction means executed by the processor for readmitting the given originating node back into the distribution group.

22. The computer as described in claim 21 wherein the readmitting means includes:

means for associating a buddy node to the given originating node; and means for controlling the buddy node to transfer a current copy of a data set to the given originating node.

* * * * *